(12) United States Patent
Zhang et al.

(10) Patent No.: US 12,103,557 B2
(45) Date of Patent: Oct. 1, 2024

(54) COMPUTERIZED DETECTION OF UNSAFE DRIVING SCENARIOS

(71) Applicant: Pony AI Inc., Grand Cayman (KY)

(72) Inventors: Yimeng Zhang, Los Altos, CA (US); Yangguang Li, Beijing (CN)

(73) Assignee: Pony AI Inc., Grand Cayman (KY)

( * ) Notice: Subject to any disclaimer, the term of this patent is extended or adjusted under 35 U.S.C. 154(b) by 346 days.

(21) Appl. No.: 17/204,050

(22) Filed: Mar. 17, 2021

(65) Prior Publication Data

US 2022/0297726 A1   Sep. 22, 2022

(51) Int. Cl.
*B60W 60/00* (2020.01)
*B60W 50/06* (2006.01)
*G01C 21/34* (2006.01)
*G05B 13/02* (2006.01)

(52) U.S. Cl.
CPC ........ *B60W 60/0015* (2020.02); *B60W 50/06* (2013.01); *G01C 21/3453* (2013.01); *G05B 13/0265* (2013.01)

(58) Field of Classification Search
CPC .............. B60W 60/0015; B60W 50/06; G05B 13/0265; G01C 21/3453
See application file for complete search history.

(56) References Cited

U.S. PATENT DOCUMENTS

| | | | |
|---|---|---|---|
| 11,590,969 B1* | 2/2023 | Crego | G06N 3/09 |
| 2019/0318267 A1* | 10/2019 | Zhang | G06N 20/00 |
| 2020/0265247 A1* | 8/2020 | Musk | G06N 20/00 |
| 2021/0387650 A1* | 12/2021 | Li | B60W 50/045 |
| 2022/0210305 A1* | 6/2022 | Feng | H04N 23/45 |
| 2022/0227389 A1* | 7/2022 | Tam | H04W 4/40 |

* cited by examiner

*Primary Examiner* — Jelani A Smith
*Assistant Examiner* — Toya Pettiegrew
(74) *Attorney, Agent, or Firm* — Sheppard, Mullin, Richter & Hampton LLP; Xin Xie

(57) ABSTRACT

Systems, methods, and non-transitory computer-readable media configured to obtain one or more series of successive sensor data frames during a navigation of a vehicle. Disengagement data is obtained. The disengagement data indicates whether a vehicle is in autonomous mode. A training dataset with which train a machine learning model is determined based on the one or more series of successive sensor data frames and the disengagement data. The training dataset includes a subset of the one or more series of successive sensor data frames and a subset of the disengagement data, the machine learning model being trained to identify unsafe driving conditions.

20 Claims, 15 Drawing Sheets

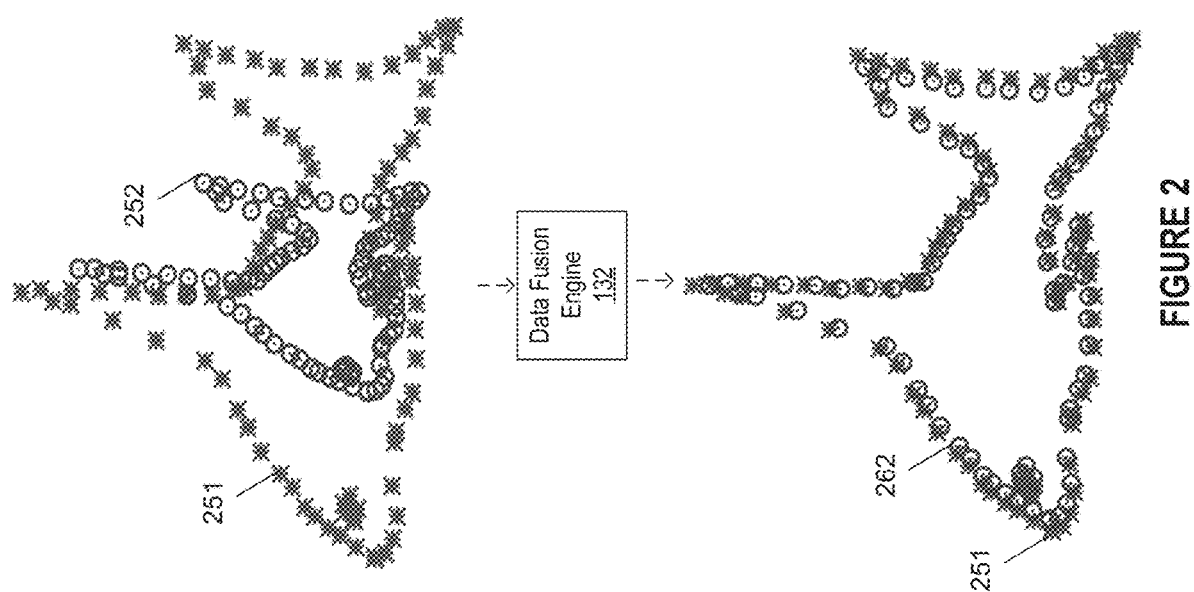

COMPUTERIZED DETECTION OF UNSAFE DRIVING SCENARIOS

BACKGROUND

A vehicle such as an autonomous or semi-autonomous vehicle can include sensors that capture sensor data from an environment. Such sensors can include, for example, camera sensors, light detection and ranging (LiDAR) sensors, radar sensors, Global Positioning System (GPS) devices, sonar-based sensors, ultrasonic sensors, accelerometers, gyroscopes, magnetometers, inertial measurement units (IMUs), and far infrared (FIR) sensors. Processors associated with the vehicle can process sensor data to detect and identify different objects or entities in the environment. In turn, the detection of these objects or entities can assist the vehicle in performing various navigation tasks such as vehicle acceleration and deceleration, vehicle braking, vehicle lane changing, adaptive cruise control, blind spot detection, rear-end radar for collision warning or collision avoidance, park assisting, cross-traffic monitoring, emergency braking, and automated distance control.

SUMMARY

Described herein are systems, methods, and non-transitory computer-readable media configured to obtain one or more series of successive sensor data frames during a navigation of a vehicle. Disengagement data indicating whether the vehicle is in autonomous mode can be obtained. A training dataset to train a machine learning model can be determined. The training dataset includes a subset of the one or more series of successive sensor data frames and a subset of the disengagement data. The machine learning model is trained to identify unsafe driving conditions. The instructions further cause the system to train, using the training dataset, the machine learning model to identify unsafe driving conditions.

In some embodiments, the training of the machine learning model includes training the machine learning model to determine a level of safety of a simulation scenario comprising a series of successive sensor data frames depicting a driving condition.

In some embodiments, the training of the machine learning model includes feeding the machine learning model two sets of data as inputs, a first set of data including a driving condition identified as safe and a second set of data including a driving condition identified as unsafe at the particular location.

In some embodiments, a first portion of the one or more series of successive sensor data frames in the training dataset is labeled as having an unsafe driving condition and a second portion of the one or more series of successive sensor data frames in the training dataset is labeled as having a safe driving condition.

In some embodiments, a first portion of the one or more series of successive sensor data frames indicates that a driver has disengaged the vehicle from an autonomous mode and the second portion of the one or more series of successive sensor data frames indicates that the vehicle remains in the autonomous mode.

In some embodiments, the one or more series of successive sensor data frames can be timestamp-synchronized with the disengagement data.

In some embodiments, a sensor data frame of the one or more series of successive sensor data frames can comprise image data merged with light detection and ranging data.

In some embodiments, the disengagement data can comprise at least one of steering wheel rotation data, acceleration pedal depression data, or brake pedal depression data.

In some embodiments, a plurality of simulation scenarios can be obtained. Safety scores corresponding to the plurality of simulation scenarios can be determined based on the at least one machine learning model. A set of simulation scenarios with which to test embedded algorithms and/or logic of an autonomous vehicle from the plurality of simulation scenarios can be selected based on the safety scores. The embedded algorithms and/or logic can be tested with the set of simulation scenarios in a simulation to assess or analyze any decisions made or actions taken by the embedded algorithms and/or logic.

In some embodiments, the set of simulation scenarios can be selected based on the safety scores being less than a threshold value.

These and other features of the apparatuses, systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

Safety EVALUATION for autonomous driving

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 2 illustrates an example implementation in which data is merged or synchronized, according to an embodiment of the present disclosure.

DETAILED DESCRIPTION

Figure 1A:
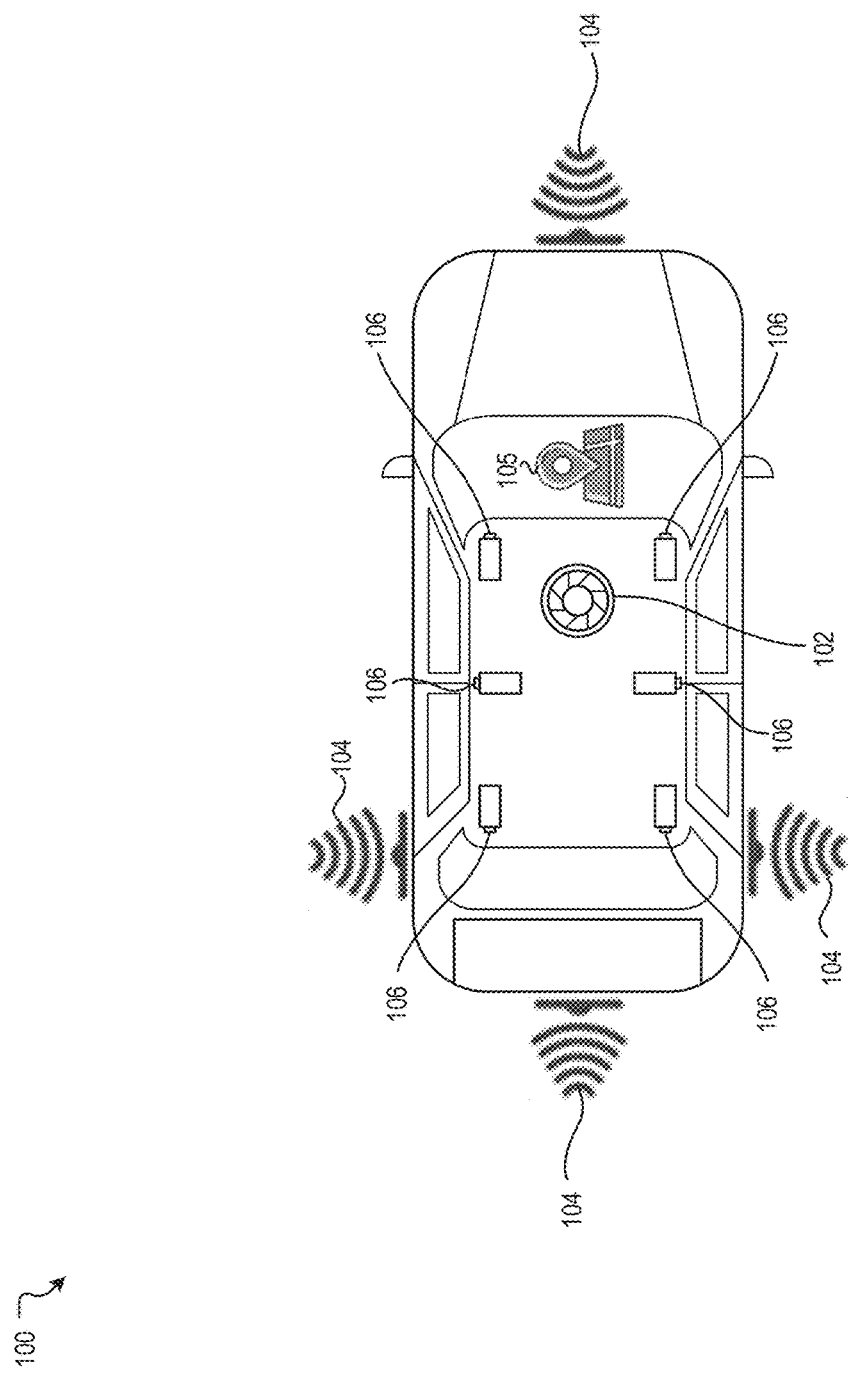
FIG. 1A illustrates an example vehicle such as an autonomous or semi-autonomous vehicle, according to an embodiment of the present disclosure.

Autonomous vehicles can be controlled by onboard embedded algorithms and/or logic that determine driving decisions based on sensor data. Embedded algorithms and/or logic that determine driving decisions, such as slowing down or stopping, undergo rigorous testing through simulations to ensure safety of the embedded algorithms and/or logic before deploying to autonomous vehicles in road testing. Under conventional approaches, simulations with which to test safety of embedded algorithms and/or logic can include simulation scenarios of various unsafe driving conditions and observe how a simulated autonomous vehicle with the embedded algorithms and/or logic reacts in response to the unsafe driving conditions. These unsafe driving conditions may involve situations in which the simulated autonomous vehicle collides with agents, such as simulated vehicles and/or pedestrians. However, limitations of modeling behaviors of agents may compromise an effectiveness of such simulations. For example, in a simulation scenario, behaviors of simulated vehicles are modeled similarly to a behavior of a simulated autonomous vehicle with minor modifications. Therefore, the behaviors of the simulated vehicles do not necessarily account for aggressive driving or other unsafe or unexpected driving behaviors, for example, by a human driver. Second, in a simulation scenario, behaviors of simulated vehicles do not account for human driving habits or tendencies. For example, in a particular driving scenario, a human driver may undertake different driving decisions than an autonomous vehicle would in avoiding or counteracting an unsafe driving condition. Moreover, determining whether a situation is safe is not simply based on a binary determination of whether a vehicle collides or avoids a collision; some situations in which a collision is avoided are still unsafe. Lastly, simulation scenarios with which embedded algorithms and/or logic are tested may not account for passenger ride quality perceptions, thus neglecting a passenger riding experience. Accordingly, simulation scenarios with which to test embedded algorithms and/or logic are not representative of real-world driving conditions and, thus, can be inaccurate or deficient in testing safety of embedded algorithms and/or logic.

Embodiments described in this application provide a system and method of improving testing of embedded algorithms and/or logic of autonomous vehicles through simulation scenarios resembling real-world driving conditions. The embedded algorithms and/or logic may determine or receive data regarding unsafe or dangerous situations and react accordingly to such situations. In various embodiments, sensor data frames during actual navigation of a vehicle may be used to train a machine learning model to recognize, detect, and/or determine potentially unsafe or dangerous, and/or unsafe or dangerous situations or scenarios. The trained machine learning model may be part of the embedded algorithms and/or logic, or may provide input to the embedded algorithms and/or logic. In some embodiments, the sensor data frames may be used to modify or update parameters, logic and/or algorithms specifically used by the machine learning model to detect such situations or scenarios. These situations or scenarios may further include situations which a passenger may perceive as unsafe or uncomfortable. In such a manner, the trained machine learning model may improve and/or expand its detection of unsafe and/or dangerous situations, so that the embedded logic and/or algorithms may be able to better react to such situations. Using inputs from the trained machine learning model regarding which situations are dangerous or unsafe, or potentially so, the embedded logic and/or algorithms may undergo simulations in order to ensure safety and efficacy of the embedded logic and/or algorithms before being deployed on a road. For example, the simulations may refine decision making of the embedded logic and/or algorithms. At least some scenarios used to create the simulations may also be generated from the sensor data frames, so that at least some of the scenarios may be similar or same as portions of the sensor data frames and reflect realistic scenarios. The simulations may be used to assess and ensure the vehicle's ability to complete a mission under a minimal completion time, interpret static and dynamic obstacles within an environment, adjust velocity and/or acceleration based on a context of road conditions, control locomotion and plan navigation, and navigate when sensor data lacks localization, for example, at a position where LiDAR range is insufficient.

The sensor data frames can be captured by the autonomous vehicle while in operation in real-world. A sensor data frame can be from any modality or combination of modalities, including camera, radar, or LiDAR, and may include three-dimensional data depicting an environment. The sensor data may include relative distances to objects and speeds of the objects in the environment. One or more sensor data frames, or a combination of one or more series of successive sensor data frames depicting driving conditions in environments, may be used to train the machine learning model. For example, a series of successive sensor data frames may depict a person walking across an intersection. Another example of combining a series of sensor data includes combining point clouds taken at different positions and/or poses, as shown in FIG. 1C.

In some embodiments, the training datasets used to train the machine learning model may be juxtaposed such that one training dataset includes one or more frames depicting a situation determined or labeled as safe and a second training dataset includes one or more frames depicting a situation determined or labeled as unsafe.

The trained machine learning model may output a safety score in different simulations. A safety score can indicate a level of safety of a driving condition. In one implementation, the safety score can be binary, with zero indicating a simulation having an unsafe driving condition and one indicating a simulation having a safe driving condition. In another implementation, the safety score can range on a scale from one to ten, with one indicating a simulation having a least safe condition and ten indicating a simulation having a safest condition. Many variations are possible. Simulations that have satisfied (or exceeded) a threshold score can be classified as safe driving conditions while simulation scenarios not satisfying the threshold score can be classified as unsafe driving conditions. These simulations can be used to test embedded algorithms and/or logic in a simulation to assess and/or confirm how an autonomous vehicle would react to conditions depicted in the simulations. As previously alluded to, at least some of these simulations may be generated by portions of the captured sensor data frames so that the simulations reflect actual conditions that would be encountered by a vehicle.

FIG. 1A illustrates an example vehicle 100 such as an autonomous vehicle, according to an embodiment of the present disclosure. As shown in FIG. 1A, in some embodiments, the autonomous vehicle 100 can include at least a LiDAR sensor 102, radar sensors 104, a GPS sensor 105, and camera sensors 106 configured to detect and identify objects in an environment. Sensor data collected by the sensors can include image data such as pictures or videos, audio data, audiovisual data captured in real-time or with a time delay. In some cases, environmental data such as temperature, pressure, or elevation can also be captured through sensors. The LiDAR sensor 102 can be configured to capture LiDAR point cloud data and generate a three-dimensional map of an environment based on the LiDAR point cloud data. The LiDAR sensors 102 can also be configured to detect objects in the environment based on the LiDAR point cloud data. The radar sensors 104 can be configured to determine distances and speeds of objects around the autonomous vehicle 100. In some cases, the radar sensors 104 may be configured for adaptive cruise control and/or accident avoidance and blind spot detection applications. The camera sensors 106 can be configured to capture and process image data to detect and identify objects depicted in the image data. Such objects can include pedestrians, road signs, traffic lights, and/or other vehicles, for example. In some cases, the camera sensors 106 can be configured to determine content of objects. In such cases, the camera sensors 106 can be configured to recognize, interpret, and analyze road signs including speed limit, school zone, construction zone signs, and traffic lights such as red light, yellow light, green light, and flashing red light. In some embodiments, the autonomous vehicle 100 can include myriad actuators to propel and navigate the autonomous vehicle 100 through an environment. Such actuators may include, for example, any suitable electro-mechanical devices or systems to control a throttle response, a braking action, a steering action, etc. of the autonomous vehicle 100.

In various embodiments, the autonomous vehicle 100 may navigate through roads, streets, and/or terrain with limited or no human input. The word "vehicle" or "vehicles" as used in this paper includes vehicles that travel on ground such as cars, trucks, and busses, but may also include vehicles that travel in air such as drones, airplanes, and helicopters, vehicles that travel on water such as boats, and submarines. Further, "vehicle" or "vehicles" discussed in this paper may or may not accommodate one or more passengers therein. In general, the autonomous vehicle 100 can effectuate any control to itself that a human driver can on a conventional vehicle. For example, the autonomous vehicle 100 can accelerate, brake, turn left or right, or drive in a reverse direction just as a human driver can on the conventional vehicle. The autonomous vehicle 100 can also sense environmental conditions, gauge spatial relationships between objects and the autonomous vehicle 100, detect and analyze road signs just as the human driver. Moreover, the autonomous vehicle 100 can perform more complex operations, such as parallel parking, parking in a crowded parking lot, collision avoidance, without any human input.

Figure 1B:
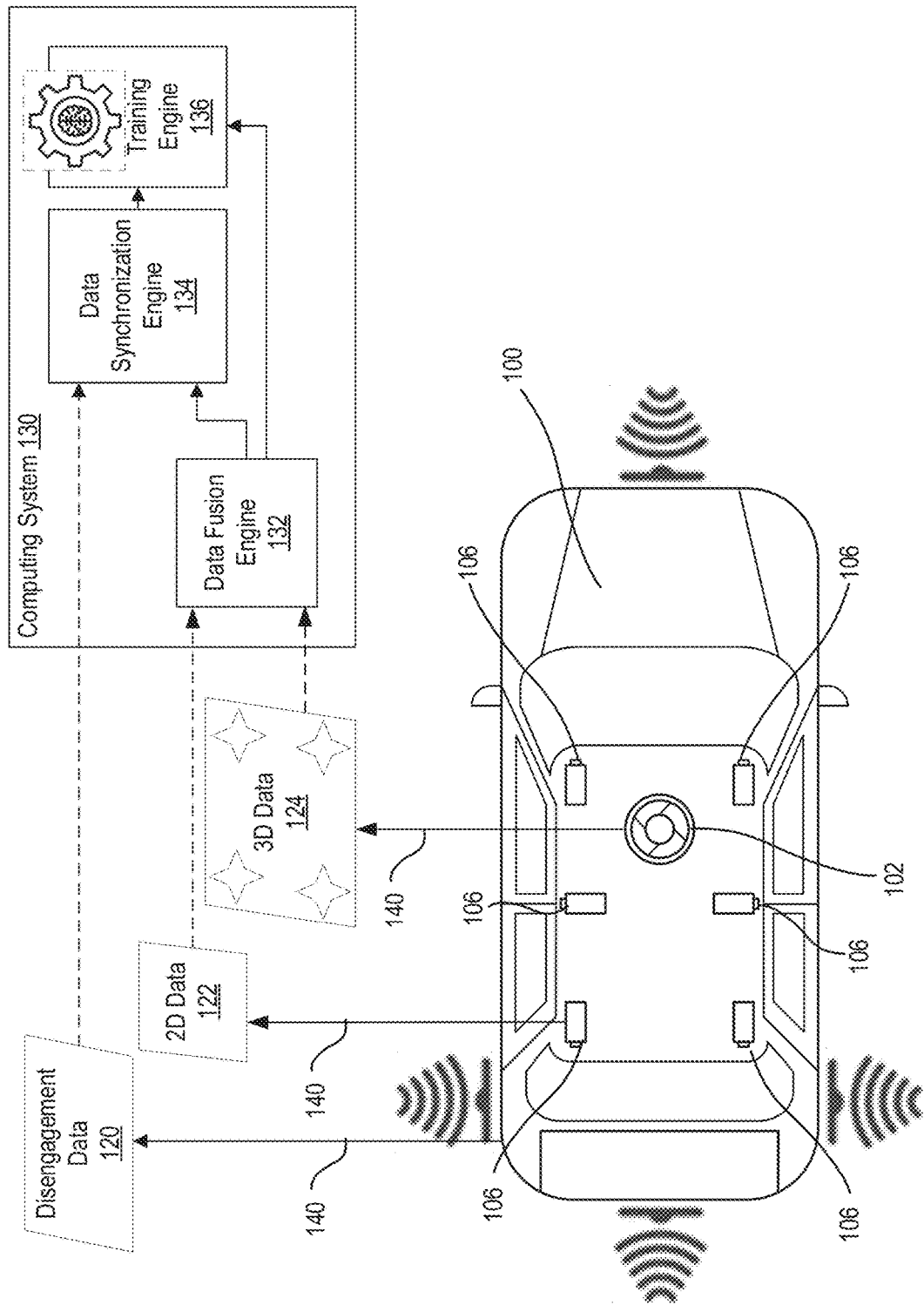
FIG. 1B illustrates a hybrid data flow and block diagram depicting a computing system configured to obtain sensor data from a vehicle such as that illustrated in FIG. 1A, according to an embodiment of the present disclosure.

FIG. 1B illustrates a hybrid data flow and block diagram that depicts a computing system 130 configured to obtain and/or process sensor data from the autonomous vehicle 100, according to an embodiment of the present disclosure. The computing system 130 may be integrated as part of the vehicle 100, or may be remote from the vehicle 100. As shown in FIG. 1B, in some embodiments, the computing system 130 can be communicatively coupled to the autonomous vehicle 100 while the autonomous vehicle 100 is in a non-active resting state. The computer system 130 can be configured to obtain or download sensor data from the autonomous vehicle 100 through one or more data links or buses 140. In some embodiments, the computing system 130 can include a data fusion engine 132, a data synchronization engine 134, and a simulation scenario generation engine 136. In general, functions described with respect to the data fusion engine 132, the data synchronization engine 134, and the simulation scenario generation engine 136 may be performed by a single processor or any number of processors. For example, functions performed by the data fusion engine 132, the data synchronization engine 134, and the simulation scenario generation engine 136 may be implemented using multiple processors. In some cases, functions performed by the data fusion engine 132, the data synchronization engine 134, and the simulation scenario generation engine 136 may not be spatially separated across multiple processors; instead, the functions must be performed by a common processor. As shown in FIG. 1B, in some embodiments, the sensor data of the autonomous vehicle 100 can include disengagement data 120, two-dimensional (2D) data 122, and three-dimensional (3D) data 124. The disengagement data 120 can comprise data indicating whether the vehicle 100 has been disengaged from an autonomous mode, and may include data relating to human driver interventions to autonomous operations of the autonomous vehicle 100. For example, the vehicle 100 may decide to change lanes based on a road condition. A safety driver inside the vehicle 100 may determine that a safer course of action is for the vehicle 100 to stay within the current lane. Therefore, in this example, the safety driver can intervene to take control of the vehicle 100 and prevent the vehicle 100 from changing lanes. In this example, the disengagement data 120 can include, for example, depressing a brake pedal and steering a steering wheel. In various embodiments, the disengagement data 120 can include steering wheel rotation data, acceleration pedal depression data, brake pedal depression data, or any other data relating to human driver intervention. The 2D data 122 can be captured from the camera sensors 106 or the LiDAR sensor 102 and can comprise 2D data frames (e.g., image data or point cloud data). The 3D data 124 can be captured from the LiDAR sensor 102 and can comprise 3D data frames (e.g., LiDAR point cloud data).

The data fusion engine 132 can be configured to generate a sensor data frame, such as a point cloud data frame, based on respective frames of the 2D data 122 and the 3D data 124. For example, a set of images associated with an environment can be merged (e.g., combined) with a set of LiDAR point clouds associated with the environment to generate a fused data frame such as a point cloud data frame. In some embodiments, the data fusion engine 132 can merge or fuse 2D data frames and 3D data frames to generate a point cloud data frame based on relative calibrated locations and/or orientations of the camera sensors 106 and the LiDAR sensor 102, and/or times at which the 2D data frames and the 3D data frames were respectively captured. For example, an image captured by a camera sensor offset by 90 degrees to a LiDAR sensor, at a particular time, can be merged with a LiDAR point cloud taken by the LiDAR sensor, at that particular time, at a 90-degree position of the LiDAR point cloud. More accurate information relating to object identification and their relative distances can be obtained from a point cloud data frame than 2D data frames and/or 3D data frames from which the point cloud data frame was generated. In some embodiments, the data fusion engine 134 can merge 2D data frames and 3D data frames to generate a point cloud data frame based on common features and/or entities depicted in the 2D data frames and the 3D data frames. For example, a set of images and a set of LiDAR point clouds can both depict a landmark. In this example, the set of images and the set of laser point clouds can be merged, based on the landmark, to generate a point cloud data frame of an environment including the landmark. In various embodiments, the common features and/or entities reflected in 2D data frames and 3D data frames can include, for example, common regions, common geographic coordinates, common landmarks, common buildings, common road signs, common vehicles, etc.

In some embodiments, the data fusion engine 132 can merge or synchronize two separate point cloud frames, as illustrated in FIG. 2. Point clouds 251 and 252 that are initially unaligned and have different origins are registered by a rigid transformation of the point cloud 252. The rigid transformation may include a translation and rotation of the point cloud 252 to align with the point cloud 251 as closely as possible. Here, the point cloud 251 may be a source, or an earlier point cloud, and the point cloud 252 may be a target, or a later point cloud that is transformed to be aligned with the point cloud 251. Following a transformation of the point cloud 252, a transformed point cloud 262 may be aligned with the point cloud 251. Outliers and background data from one or both of the point clouds 251 and 252 may be detected and filtered following an initial transformation, and following removal of outliers and background data, the registration process may be repeated to further align the two point clouds.

In some embodiments, the data fusion engine 132 can merge 2D data frames and 3D data frames based on a fuzzy logic inference framework. In some cases, the data fusion engine 132 can smooth successive point cloud data frames (e.g., fused data frames) using a Markov random field based on a temporal fusion method. Many variations are possible.

The data synchronization engine 134 can be configured to associate the disengagement data 120 and sensor data such as point cloud data frames generated by the data fusion engine 132 to indicate whether the vehicle 100 is disengaged from the autonomous mode at a time of capture of each sensor data frame. Thus, a pair of data frames, or a pair of series of data frames, can be readily juxtaposed in a manner such that one data frame or series in a first training dataset represents the vehicle 100 being disengaged from the autonomous mode and a second data frame or series in a second training dataset represents the vehicle remaining in the autonomous mode. In some embodiments, the data synchronization engine 134 can associate the disengagement data 120 and the sensor data frames by timestamp-synchronization. For example, a set of point cloud data frames can be associated with timestamps ranging from 1:00:00 to 1:10:00. In this example, data relating to a brake pedal depression action (i.e., a disengagement action) can be associated with or correspond to timestamps ranging from 1:05:00 to 1:05:30. In this example, the data relating to the brake pedal depression action can be synchronized to a subset of point cloud data frames in the set that corresponds to 1:05:00 to 1:05:30. In this way, data relating to disengagement actions a safety driver took to intervene in autonomous operations of the vehicle 100 can be synchronized to corresponding point cloud data frames to associate the disengagement actions to the corresponding point cloud data frames.

The training engine 136 can be configured to generate and/or organize training datasets, and feed such training datasets, to train one or more machine learning models to detect unsafe or dangerous situations. In some embodiments, the one or more machine learning models may further be trained to generate scenarios, such as from dangerous situations, used to test algorithms and/or logic of the vehicle 101. The machine learning model may include, in some embodiments, a random forest model or a neural network. In some examples, the training engine 136 feeds, into the machine learning model, pairs of training datasets juxtaposed such that a first training dataset represent, indicates, and/or is labeled as a safe situation while a second training dataset represent, indicates, and/or is labeled as an unsafe situation. In such a manner, the machine learning model may infer and/or determine differences between the training datasets to determine factors and/or parameters that cause a situation to be unsafe. In some embodiments, a dataset labeled as unsafe corresponds to a vehicle being disengaged from an autonomous mode, while a dataset labeled as safe corresponds to a vehicle remaining in the autonomous mode. One example of the juxtaposition of a first training dataset that includes data corresponding to a safe situation and a second training dataset that includes data corresponding to an unsafe situation occurs when one training dataset includes a frame or a series of frames from a particular location determined or labeled as safe and a second training dataset includes a frame or a series of frames from that same particular location determined or labeled as unsafe. As another example, one training dataset may include a frame or a series of frames from a particular range of timestamps or locations determined or labeled as safe and a second training dataset may include a frame or a series of frames from that same particular range of timestamps or locations determined or labeled as unsafe. In such a manner, the machine learning model may be able to determine or infer which parameters or factors cause a situation to be safe or unsafe, such as a density of traffic, speed or acceleration of vehicles, lighting conditions, concentration of pedestrians, particular locations such as intersections or corners, or certain sounds. By juxtaposing the training datasets, in which at least one factor, such as a time range or a location, is kept constant or similar among the pair of training datasets, such as a time range or a location, the machine learning model may determine or infer whether, and to what extent, any of the differences between the juxtaposed data frames cause a situation to be unsafe. For example, if a difference between a situation determined to be safe and another situation determined to be unsafe at a same location, and/or having similar traffic density, is that the situation determined to be safe was obtained during daytime and the other situation determined to be unsafe was at nighttime, the machine learning model may infer that a lack of lighting causes a situation to be unsafe. By using multiple juxtaposed training datasets, the machine learning model may further isolate, refine and/or confirm parameters and/or factors used to determine a level of safety of a situation. Examples of such juxtaposed training datasets are shown in FIGS. 4-10.

The training dataset can include one or more sensor data frames or series of successive sensor data frames such as point cloud data frames timestamp-synchronized with disengagement data obtained from a data synchronization engine (e.g., the data synchronization engine 134 of FIG. 1B). The training engine 136 can label each data frame or each series of successive sensor data frames as being a safe or an unsafe driving condition based on whether disengagement data indicates that the vehicle 100 was disengaged at the time of capture of the data frame or series of data frames. For example, a series of successive sensor data frames captured by the vehicle 100 may depict a pedestrian standing at a sidewalk at an intersection at some distance ahead. Upon detecting the pedestrian, the vehicle 100 may continue to travel at current speed. A safety driver onboard the vehicle 100 may depress a brake pedal to slow down the vehicle 100 in anticipation of the pedestrian unexpectedly stepping into the intersection. In this example, disengagement data that includes data of depressing the brake pedal, indicated by pressure applied to the brake pedal, can be timestamp-synchronized with the series of successive sensor data frames. In this example, the series of successive sensor data frames can be labeled as having an unsafe driving condition (i.e., the anticipation of the pedestrian unexpectedly stepping into the intersection). In cases where a series of successive sensor data frames depicting driving conditions does not have associated timestamp-synchronized disengagement data, the series of successive sensor data frames can be labeled as having a safe driving condition because no human driver intervention was recorded during the time the series of successive sensor data frames was captured. Once the one or more series of successive sensor data frames of the training dataset are labeled, the training dataset can be used to train the one or more machine learning models. In some embodiments, labels provided by the training engine 136 can be further reviewed and modified by a human reviewer. For example, the training engine 136 may determine a series of successive sensor data frames as having a safe driving condition because there was no associated disengagement data. In this example, upon further review, a human reviewer may determine that the series of successive sensor data frames have an unsafe driving condition. In this example, the human reviewer may change a label for the series of successive sensor data frames as having an unsafe driving condition. In general, the training engine 136 can train the one or more machine learning models using any suitable training method. For example, in one implementation, training of the one or more machine learning models may be supervised. In other implementations, training of the one or more machine learning models may be unsupervised. Many variations are possible. The training engine 136 will be discussed in further detail with reference to FIGS. 3-10.

Figure 3:
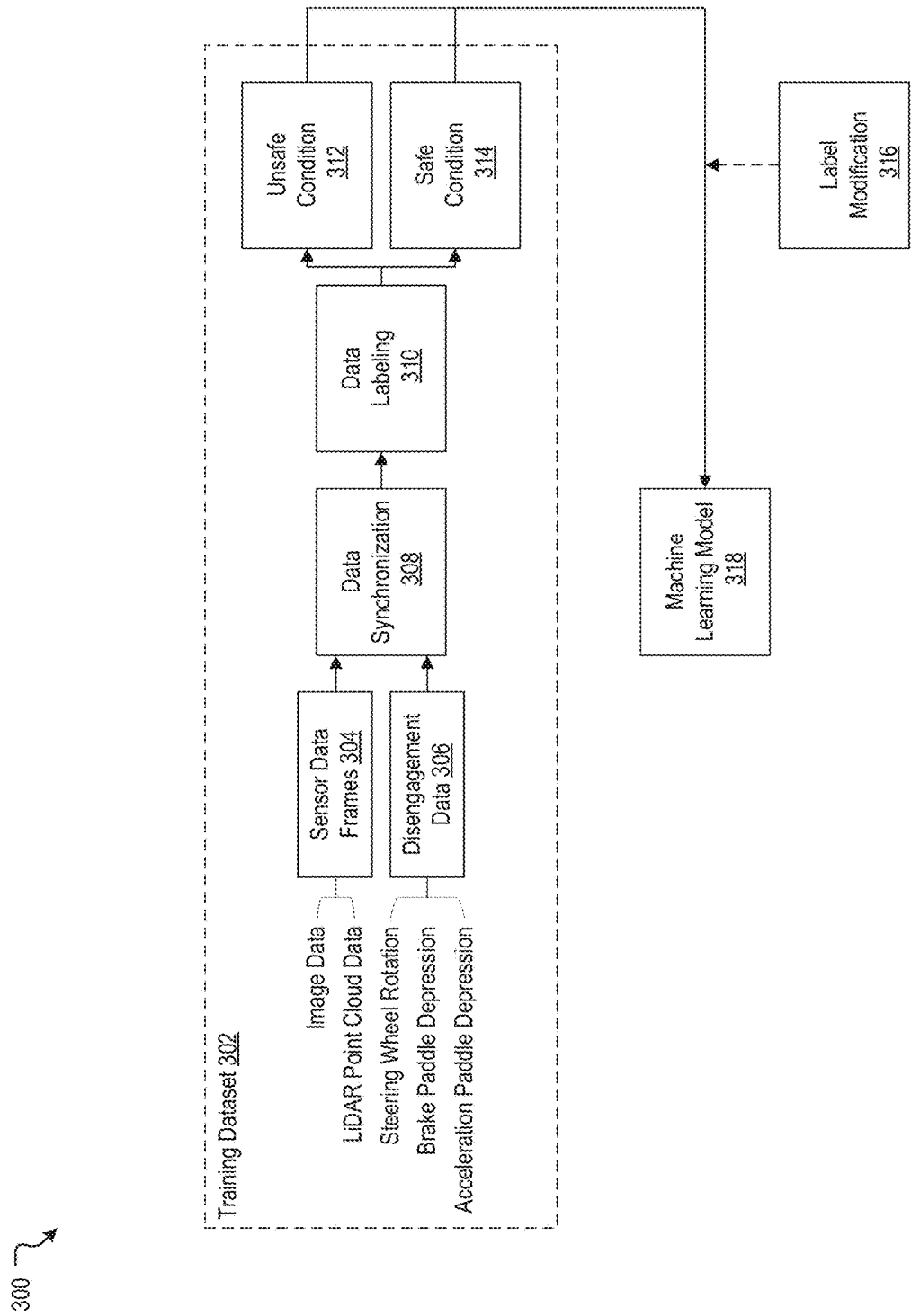
FIG. 3 illustrates an example functional block diagram for training a machine learning model to detect or identify dangerous or unsafe, or potentially dangerous or unsafe conditions.

FIG. 3 illustrates an example functional block diagram 300 for training a machine learning model, according to an embodiment of the present disclosure. Functionalities described in the functional block diagram 300 can be supported by the training engine 136 of FIG. 1B. In various embodiments, the functional block diagram 300 can include a training dataset 302. The training data set 302 can comprise sensor data frames 304 depicting a driving condition in an environment (e.g., a series of successive sensor data frames) and disengagement data 306. The sensor data frames 304 can be generated by merging (e.g., fusing) image data and LiDAR sensor data depicting the driving condition. For example, the sensor data frames 304 can comprise image data captured by camera sensors (e.g., the camera sensors 106 of FIG. 1) depicting an object or a driving condition in an environment merged with sensor data captured by a LiDAR sensor (e.g., the LiDAR sensors 102 of FIG. 1) depicting the object or the driving condition in the environment. The disengagement data 306 can include data relating to human driver interventions with autonomous operations of an autonomous vehicle (e.g., the autonomous vehicle 100 of FIG. 1). For example, the disengagement data 306 can include steering wheel rotation data, brake paddle depression data, acceleration paddle depression data, or any other data relating to human driver intervention. The sensor data frames 304 and the disengagement data 306 can be timestamp-synchronized by a data synchronization engine (e.g., the data synchronization engine 134 of FIG. 1B) at block 308 (e.g., "Data Synchronization"). The sensor data frames 304 can be labeled as having a safe or an unsafe driving condition at block 310 (e.g., "Data Labeling"). As discussed above, if the sensor data frames 304 are associated with the disengagement data 306 based on their respective timestamps, the sensor data frame 304 can be labeled as having an unsafe driving condition at block 312 (e.g., "Unsafe Condition"). If the sensor data frames 304 are not associated with the disengagement data 306 based on their respective timestamps, the sensor data frame 304 can be labeled as having a safe driving condition at block 314 (e.g., "Safe Condition"). In some cases, the sensor data frames 304 as labeled may be reviewed and modified by a human reviewer at block 316 (e.g., "Label Modification"). The sensor data frames 304 and other sensor data frames can be used to train a machine learning model 318 to detect a dangerous or unsafe, or potentially dangerous or unsafe condition, and/or revise preexisting logic and/or parameters used by the machine learning model 318.

Figure 4:
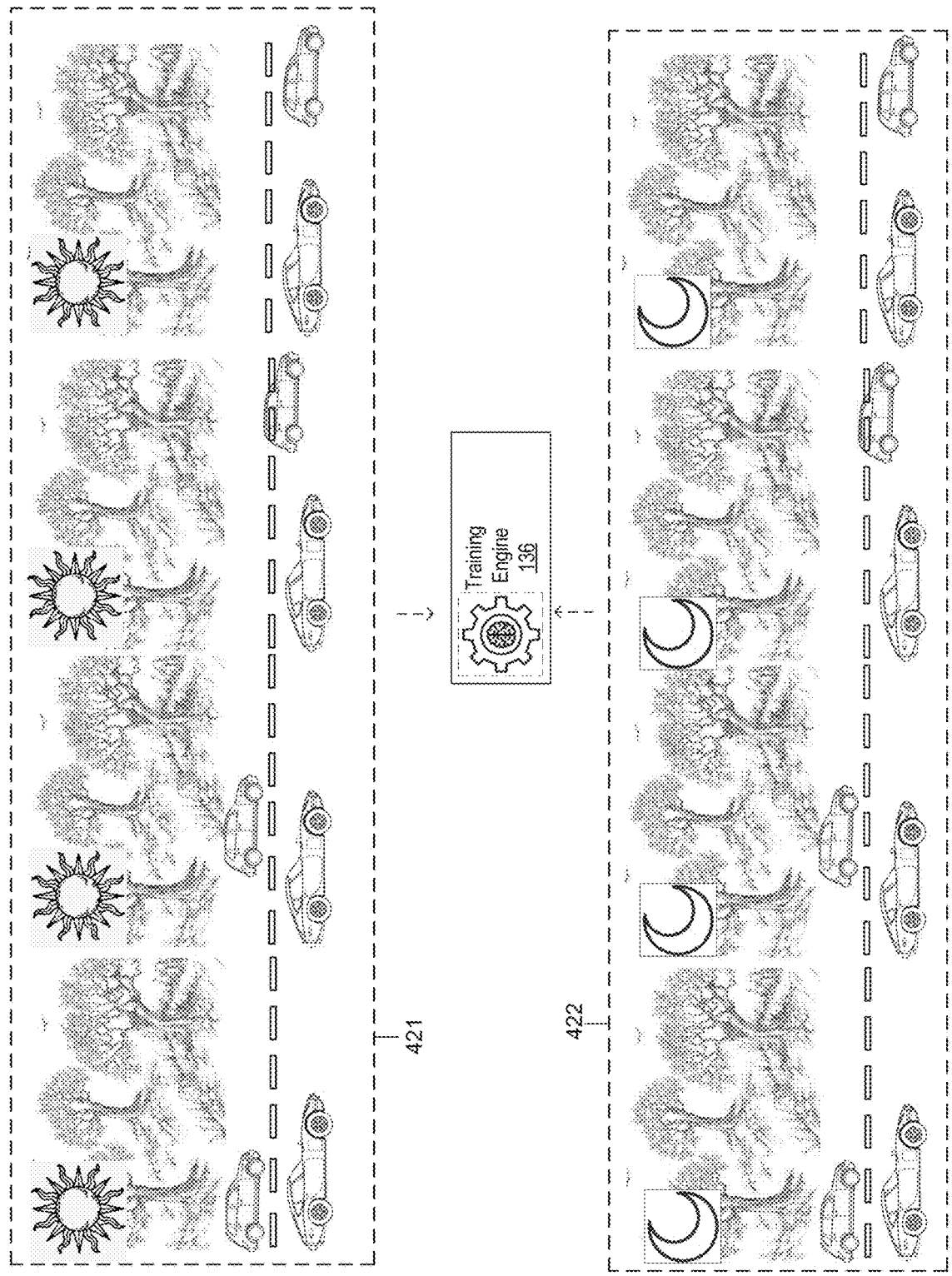
FIGS. 4-10 illustrate exemplary implementations of training a machine learning model to detect or identify dangerous or unsafe, or potentially dangerous or unsafe conditions, according to an embodiment of the present disclosure.

FIG. 4 illustrates an exemplary implementation of the computing system 130, in particular, of the training engine 136. In some embodiments, the training engine 136 may feed, into a machine learning model, a first training dataset 421 that includes one or more frames, or series of frames, having conditions identified as safe and a second training dataset 422 that includes one or more frames, or series of frames, conditions identified as unsafe. For example, the machine learning model may identify differences between the juxtaposed training datasets, specifically, between first training dataset 421 and the second training dataset 422. For example, the first training dataset 421 may be identified to have bright lighting conditions while the second training dataset 422 may be identified to have dark lighting conditions, and both the first training dataset 421 and the second training dataset 422 may have been taken at a same or similar position and/or pose, and/or have same or similar driving conditions of a vehicle passing, in order to isolate relevant factors or parameters. Therefore, the machine learning model may infer that darkness, or a level of ambient light, is a parameter or factor in determining whether or not a situation is dangerous. In particular, the machine learning model may infer that such a parameter or factor is particularly relevant during a situation of yielding to a passing vehicle, and that at nighttime, a larger separation distance may be required to safely pass a vehicle. By using the first training dataset 421 and the second training dataset 422, the machine learning model may better identify, or refine its previous identification of, parameters or factors that cause a situation to be identified as dangerous. Thus, a vehicle may be able to stop or slow down once a situation is identified as dangerous. Other pairs of juxtaposed training datasets may depict different lighting conditions as related to other driving conditions such as yielding to a pedestrian, U-turns, sharp turns, or speeding on a road. Thus, the machine learning model may identify or determine whether lighting conditions affect whether these driving situations are identified or perceived as dangerous.

Figure 5:
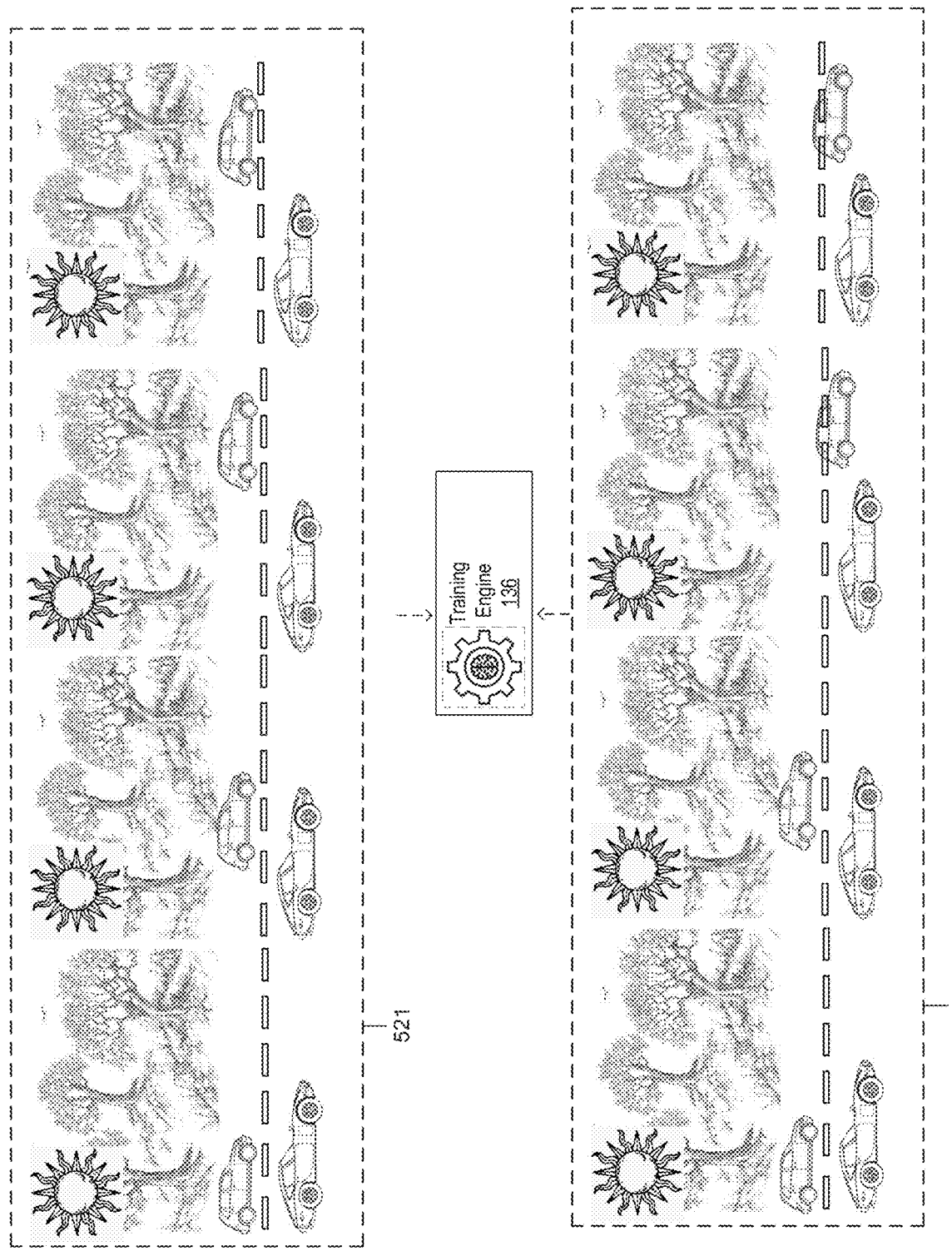

FIG. 5 illustrates an exemplary implementation of the computing system 130, in particular, of the training engine 136. In some embodiments, the training engine 136 may feed, into a machine learning model, a first training dataset 521 that includes one or more frames, or series of frames, having conditions identified as safe and a second training dataset 522 that includes one or more frames, or series of frames, conditions identified as unsafe. For example, the machine learning model may identify differences between the juxtaposed training datasets, specifically, between first training dataset 521 and the second training dataset 522. For example, the first training dataset 521 may be identified to include a driving situation in which two vehicles are driving straight on separate lanes while the second training dataset 522 may be identified to include a driving situation in which a vehicle is attempting to pass another, and both the first training dataset 521 and the second training dataset 522 may have been taken at a same or similar position and/or pose, and/or have similar or same distances between vehicles, in order to isolate relevant factors or parameters. Therefore, the machine learning model may infer that while passing, two vehicles need to maintain a larger distance to be considered a safe condition, compared to two vehicles driving straight on separate lanes. Thus, whether two vehicles are a safe distance apart depends on whether or not a vehicle is passing another vehicle. By using the first training dataset 521 and the second training dataset 522, the machine learning model may better identify, or refine its previous identification of, parameters or factors that cause a situation to be identified as dangerous. Thus, a vehicle may be able to stop or slow down once a situation is identified as dangerous. Other pairs of juxtaposed training datasets may depict vehicles travelling at different speeds. For example, a safe distance that two vehicles need to be separated by may be greater if one or both vehicles is/are travelling faster.

Figure 6:
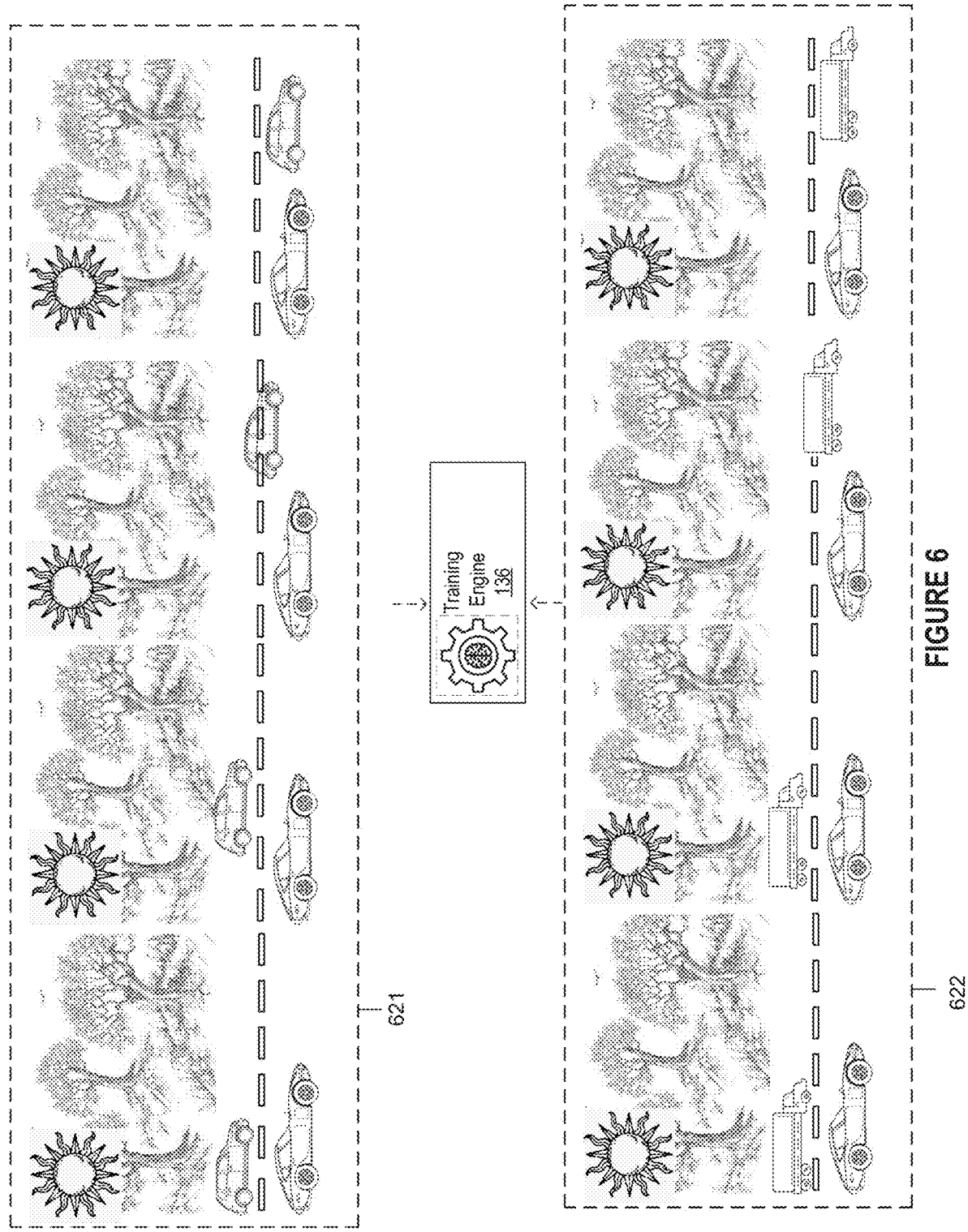

FIG. 6 illustrates an exemplary implementation of the computing system 130, in particular, of the training engine 136. In some embodiments, the training engine 136 may feed, into a machine learning model, a first training dataset 621 that includes one or more frames, or series of frames, having conditions identified as safe and a second training dataset 622 that includes one or more frames, or series of frames, conditions identified as unsafe. For example, the machine learning model may identify differences between the juxtaposed training datasets, specifically, between first training dataset 621 and the second training dataset 622. For example, the first training dataset 621 may be identified to include two cars in which one car is passing another car while the second training dataset 622 may be identified to have a truck passing a car, and both the first training dataset 621 and the second training dataset 622 may have been taken at a same or similar position and/or pose, lighting conditions, and/or have same or similar driving conditions of a vehicle passing, in order to isolate relevant factors or parameters. Therefore, the machine learning model may infer that a size or type of a vehicle, is a parameter or factor in determining whether or not a situation is dangerous. In particular, the machine learning model may infer that such a parameter or factor is particularly relevant during a situation of yielding to a passing vehicle, and that for a larger vehicle such as a truck, a larger separation distance may be required to safely pass a vehicle. By using the first training dataset 621 and the second training dataset 622, the machine learning model may better identify, or refine its previous identification of, parameters or factors that cause a situation to be identified as dangerous. Thus, a vehicle may be able to stop or slow down once a situation is identified as dangerous. Other pairs of juxtaposed training datasets may depict different speeds or different road conditions, such as sloped or bumpy conditions, that may factor in to whether a situation is identified or perceived as dangerous.

Figure 7:
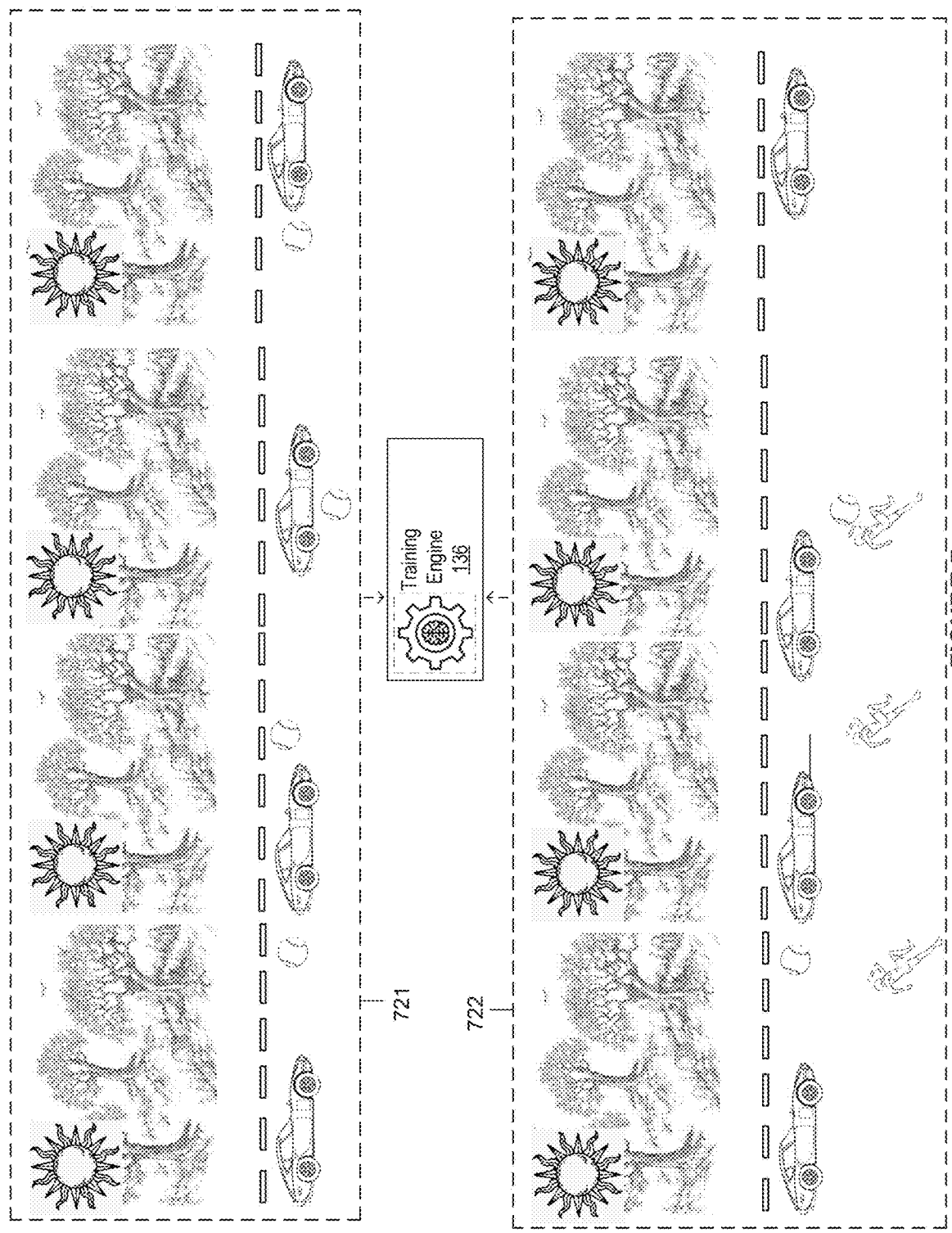

FIG. 7 illustrates an exemplary implementation of the computing system 130, in particular, of the training engine 136. In some embodiments, the training engine 136 may feed, into a machine learning model, a first training dataset 721 that includes one or more frames, or series of frames, having conditions identified as safe and a second training dataset 722 that includes one or more frames, or series of frames, conditions identified as unsafe. For example, the machine learning model may identify differences between the juxtaposed training datasets, specifically, between first training dataset 721 and the second training dataset 722. For example, the first training dataset 721 may include contextual factors that, individually, would not render a situation dangerous, but the second training dataset 722 may include a combination of contextual factors that would render a situation dangerous. For example, the first training dataset 721 may be identified to include an object on a road such as a ball, or a person standing on a side of the road while the second training dataset 722 may be identified to have both an object on a road and a person standing on a side of the road, and both the first training dataset 721 and the second training dataset 722 may have been taken at a same or similar position and/or pose, in order to isolate relevant factors or parameters. Therefore, the machine learning model may infer that an object on a road and a person standing on a side of the road within a threshold distance, taken in context, may render a situation dangerous, even though each factor alone (just an object, or just a person standing on a side of the road) would not render the situation dangerous. By using the first training dataset 721 and the second training dataset 722, the machine learning model may better identify, or refine its previous identification of, parameters or factors that cause a situation to be identified as dangerous. Thus, a vehicle may be able to stop or slow down once a situation is identified as dangerous. Other pairs of juxtaposed training datasets may depict different combinations of contextual factors, such as, for example, a vehicle driving parallel to two trucks, or a truck and a bicycle, even if driving parallel to a single truck or a single bicycle does not render a situation dangerous. Thus, the machine learning model may identify or determine whether certain combinations of factors affect an identification or determination of whether a situation is dangerous.

Figure 8:
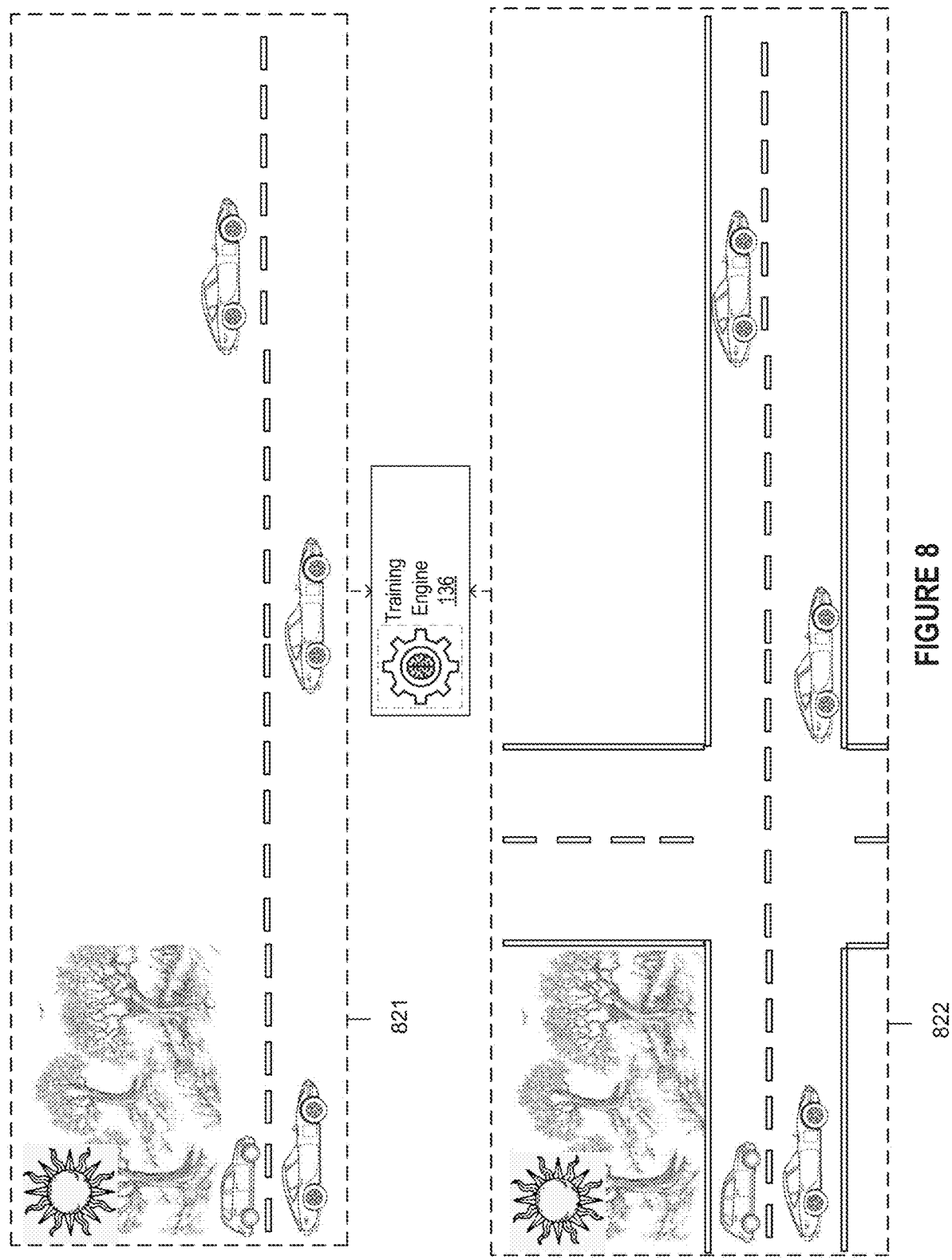

FIG. 8 illustrates an exemplary implementation of the computing system 130, in particular, of the training engine 136. In some embodiments, the training engine 136 may feed, into a machine learning model, a first training dataset 821 that includes one or more frames, or series of frames, having conditions identified as safe and a second training dataset 822 that includes one or more frames, or series of frames, conditions identified as unsafe. For example, the machine learning model may identify differences between the juxtaposed training datasets, specifically, between first training dataset 821 and the second training dataset 822. For example, the first training dataset 821 may be identified to include a road having an intersection whereas the second training dataset 822 may be identified to include a road having no intersection. In particular, a passenger may perceive that an action that would be safe on a straight road would not be safe at an intersection. For example, driving parallel to another vehicle, or passing another vehicle, may be perceived as safe on a straight road but not safe at an intersection. Both the first training dataset 821 and the second training dataset 822 may have been taken on similar roads, locations, and/or levels of ambient light. Therefore, the machine learning model may infer that whether or not a vehicle is at an intersection is a parameter or factor in determining whether or not a situation is dangerous. In particular, the machine learning model may infer that such a parameter or factor is particularly relevant during a situation of driving parallel to or passing another vehicle. By using the first training dataset 821 and the second training dataset 822, the machine learning model may better identify, or refine its previous identification of, parameters or factors that cause a situation to be identified as dangerous. Thus, a vehicle may be able to stop or slow down once a situation is identified as dangerous. Other pairs of juxtaposed training datasets may depict different road or driving conditions such as a straight road compared to a curved road, a bumpy road compared to a level road, or different materials of roads such as asphalt, concrete, composite, bituminous, or gravel, to determine whether such factors affect whether a situation is identified or perceived as dangerous.

Figure 9:
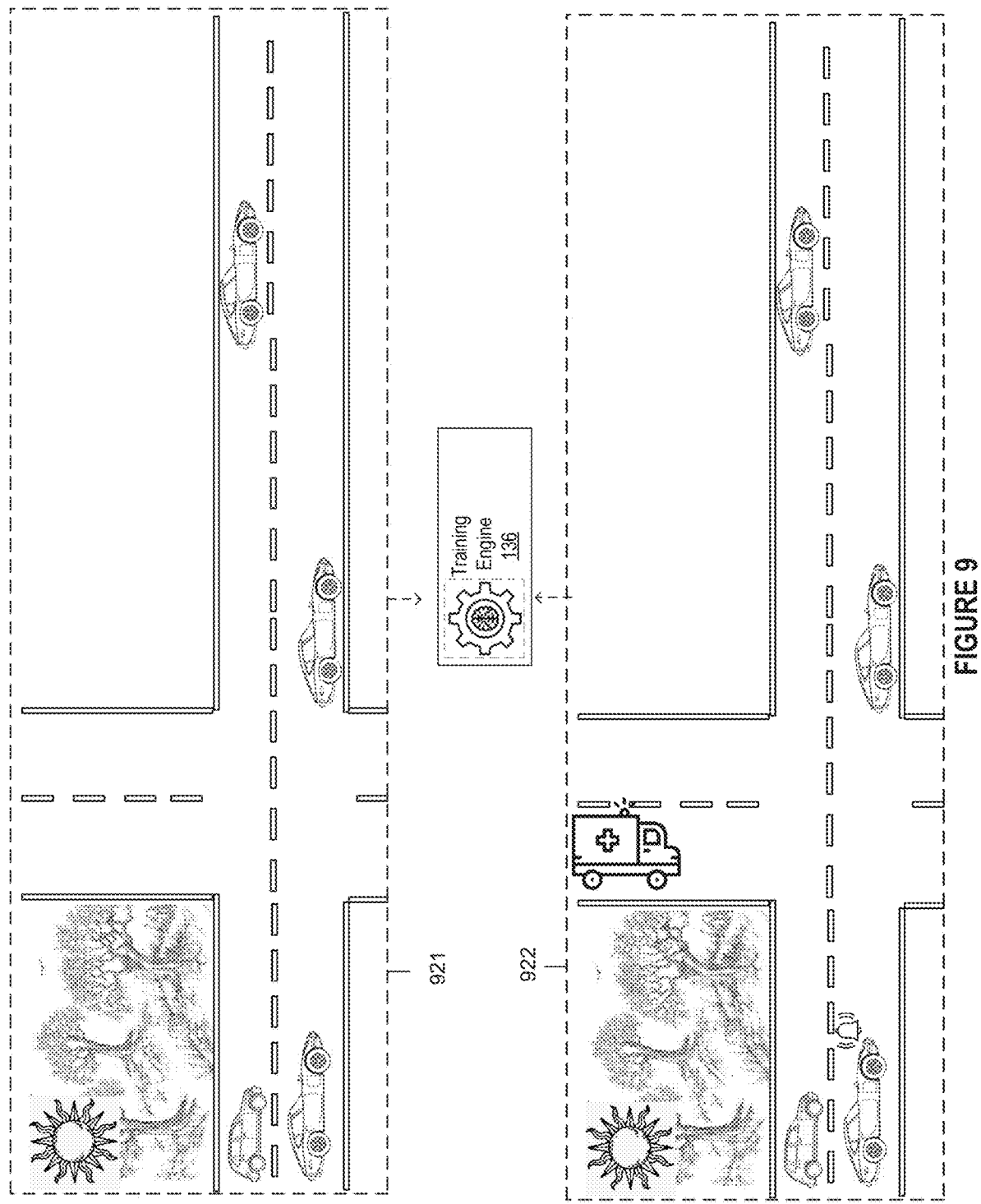

FIG. 9 illustrates an exemplary implementation of the computing system 130, in particular, of the training engine 136. In some embodiments, the training engine 136 may feed, into a machine learning model, a first training dataset 921 that includes one or more frames, or series of frames, having conditions identified as safe and a second training dataset 922 that includes one or more frames, or series of frames, conditions identified as unsafe. For example, the machine learning model may identify differences between the juxtaposed training datasets, specifically, between first training dataset 921 and the second training dataset 922. For example, the first training dataset 921 may be identified to not contain any siren or alarm signals while the second training dataset 422 may be identified to contain sirens or alarm signals, and both the first training dataset 921 and the second training dataset 922 may have been taken at a same or similar position and/or pose, and/or have same or similar driving conditions, in order to isolate relevant factors or parameters. Therefore, the machine learning model may infer that a siren, either alone without an emergency vehicle being visible, or in combination with an emergency vehicle, is a parameter or factor in determining whether or not a situation is dangerous. By using the first training dataset 921 and the second training dataset 922, the machine learning model may better identify, or refine its previous identification of, parameters or factors that cause a situation to be identified as dangerous. Thus, a vehicle may be able to stop or slow down once a situation is identified as dangerous. Thus, the machine learning model may identify or determine whether certain noises such as different alarms or sirens affect whether certain driving situations are identified or perceived as dangerous.

Figure 10:
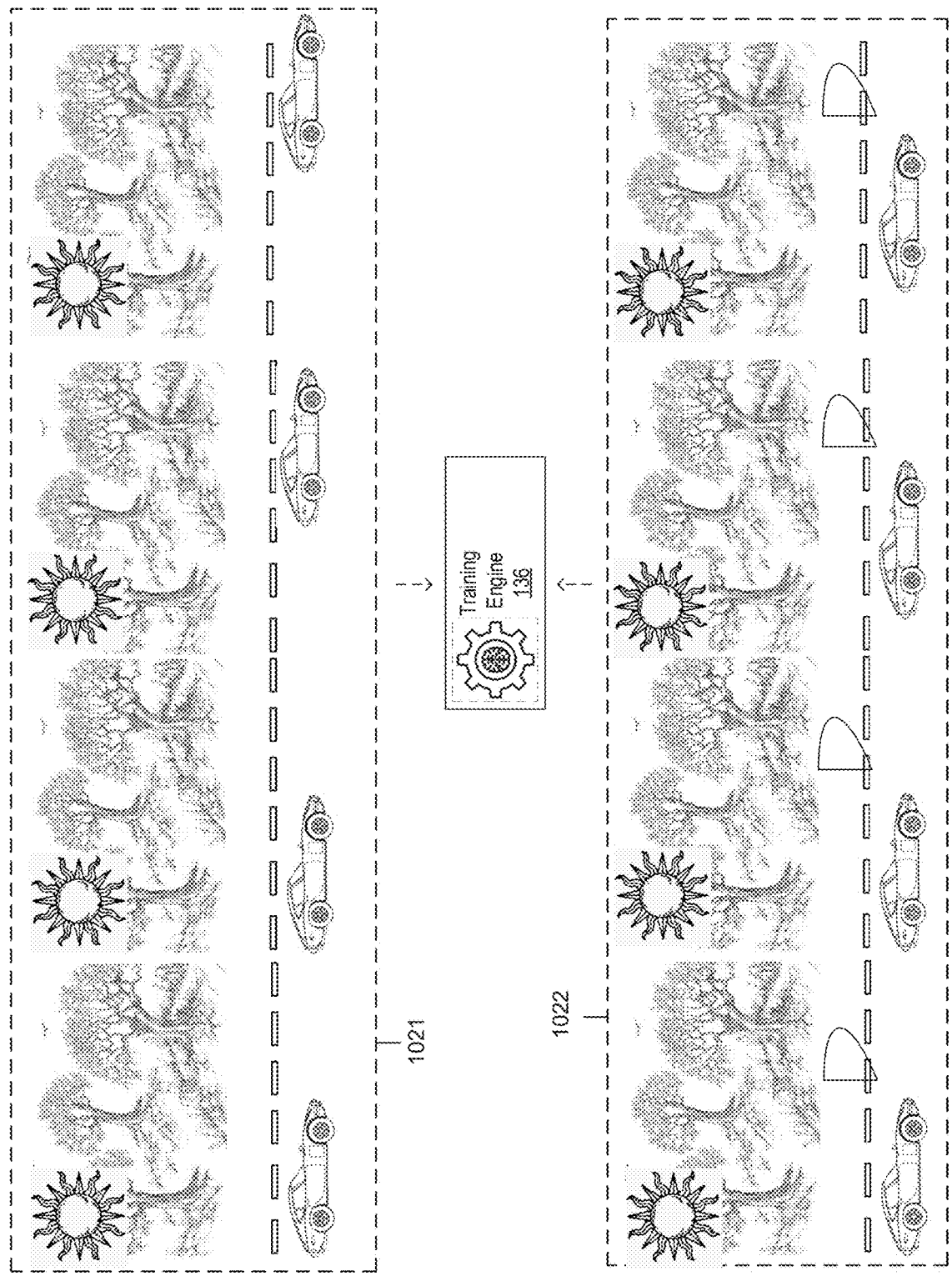

FIG. 10 illustrates an exemplary implementation of the computing system 130, in particular, of the training engine 136. In some embodiments, the training engine 136 may feed, into a machine learning model, a first training dataset 1021 that includes one or more frames, or series of frames, having conditions identified as safe and a second training dataset 1022 that includes one or more frames, or series of frames, conditions identified as unsafe. For example, the machine learning model may identify differences between the juxtaposed training datasets, specifically, between first training dataset 1021 and the second training dataset 1022. For example, the first training dataset 1021 may be identified to include a level or smooth road while the second training dataset 1022 may be identified to include a bumpy portion of road and both the first training dataset 921 and the second training dataset 922 may have been taken at a same or similar position and/or pose, and/or have same or similar driving conditions and/or lighting conditions, in order to isolate relevant factors or parameters. Therefore, the machine learning model may infer that a protrusion or object, even if not on a lane that a vehicle is driving, may cause an otherwise safe driving condition to be identified or perceived as dangerous. By using the first training dataset 1021 and the second training dataset 1022, the machine learning model may better identify, or refine its previous identification of, parameters or factors that cause a situation to be identified as dangerous. Thus, a vehicle may be able to stop or slow down once a situation is identified as dangerous. Thus, the machine learning model may identify or determine whether certain road irregularities, even if on a different lane from which a vehicle is travelling, affect whether certain driving situations are identified or perceived as dangerous.

Thus, the machine learning model may be trained using any combination of the embodiments, as described in FIGS. 4-10. Once the machine learning model is trained, the machine learning model may be included in embedded logic and/or algorithms. The embedded logic and/or algorithms may be further tested and/or validated using simulations. At least some of the simulations that are used to test the embedded logic and/or algorithms may include portions of the sensor data frames so that the simulations are realistic. The simulations themselves may be included in another training dataset such as a third training dataset. In some embodiments, the embedded logic and/or algorithms can generate a safety score for a simulation. Based on respective safety scores of simulations, the embedded logic and/or algorithms can classify each simulation as having a safe driving condition or a driving unsafe condition. For example, a simulation with a safety score that exceeds a threshold value can be determined to have a safe driving condition. On the other hand, a simulation with a safety score that falls below a threshold value can be determined to have an unsafe driving condition, in which event a vehicle would need to take action such as stopping or slowing down, depending on how unsafe the driving condition is. Various simulations with varying degrees of unsafe driving conditions can be used to test embedded algorithms and/or logic of autonomous vehicles. In some embodiments, simulations that depict unsafe conditions are used to test embedded algorithms and/or logic of autonomous vehicles in a simulation. In this way, a simulated autonomous vehicle with the embedded algorithms and/or logic can be subjected to worst-case simulation scenarios to see how the simulated autonomous vehicle reacts to unsafe driving conditions. The embedded algorithms and/or logic can be loaded (or compiled) into a simulated autonomous vehicle to see how the simulated autonomous vehicle reacts to unsafe driving conditions that closely model real-world driving conditions.

In some embodiments, the safety score can be binary, with zero indicating a simulation having an unsafe driving condition and one indicating a simulation having a safe driving condition. In other embodiments, the safety score can range on a scale from one to ten, with one indicating a simulation having the least safe driving condition and ten indicating a simulation having the safest driving condition. Many variations are possible. In some embodiments, a confidence score may indicate a degree of certainty in the safety score.

The embedded algorithms and/or logic may be validated based on an accuracy, precision, and/or recall of detecting unsafe conditions. Further adjustments to the embedded algorithms and/or logic may be made based on an accuracy, precision, and/or recall. For example, in a neural network, weights and/or biases of sigmoid functions in each of the perceptrons may be adjusted based on an accuracy, precision, and/or recall.

Figure 11:
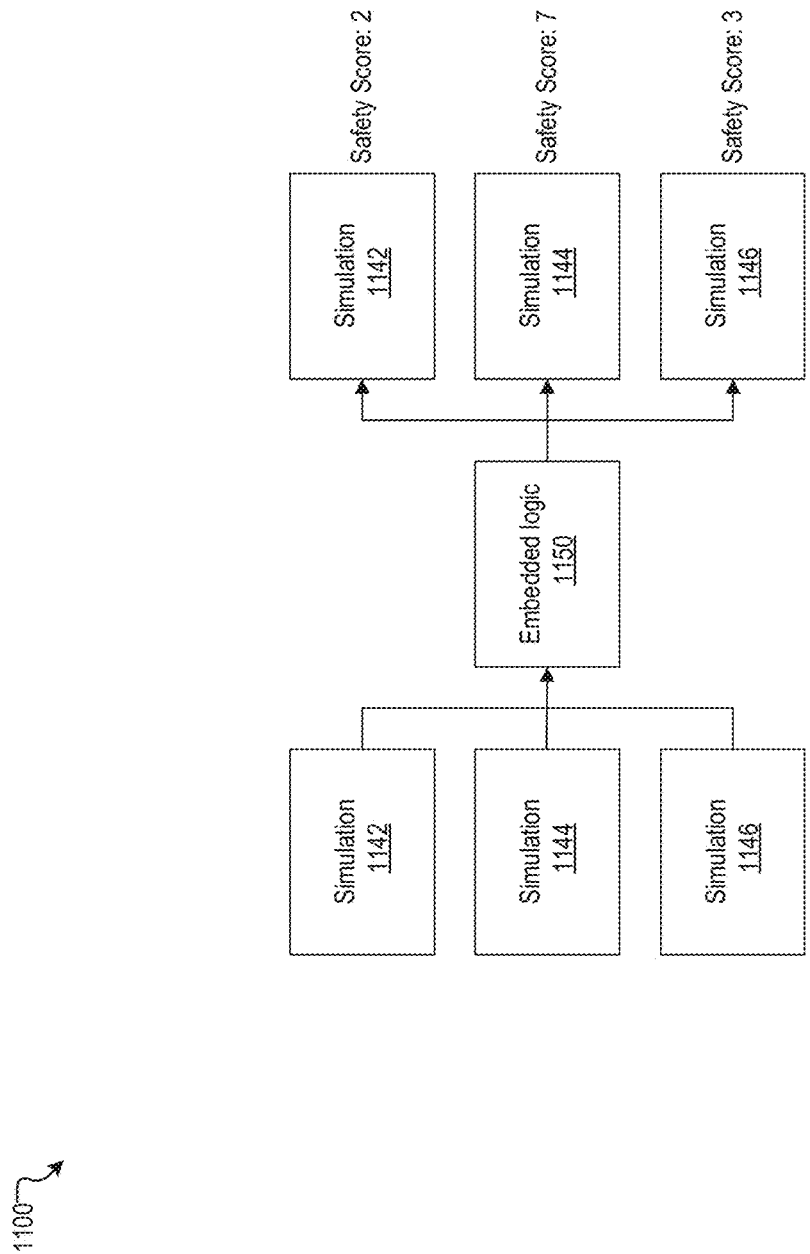
FIGS. 11-12 illustrate a simulation process for testing embedded algorithms and/or logic of autonomous vehicles in simulations that incorporates the trained machine learning model, an example computing environment for testing embedded algorithms and/or logic of autonomous vehicles in simulations, according to an embodiment of the present disclosure.

FIG. 11 illustrates an example functional block diagram 1100 for determining safety scores for simulations, according to an embodiment of the present disclosure. In various embodiments, the functional block diagram 1100 can include a plurality of simulations 1142, 1144, 1146. Each of the plurality of simulations 1142, 1144, 1146 can comprise a series of sensor data frames, at least a portion of which depict a driving condition in an environment obtained from a data fusion engine (e.g., the data fusion engine 132 of FIG. 1B). Each of the plurality of simulations 1142, 1144, 1146 can be inputted into embedded logic 1150, which may include a machine learning model such as the machine learning model as trained by the training engine 136. The embedded logic 1150 can determine a safety score for each of the plurality of simulations 1142, 1144, 1146. In general, the more unsafe a driving condition depicted in a simulation is, the lower the safety score. As shown in FIG. 11, in the block diagram 1100, the embedded logic 1150 determines the simulation 1142 to have a safety score of 2, the simulation 1144 to have a safety score of 7, and the simulation 1146 to have a safety score of 3. Therefore, in the block diagram 1100, simulation 1142 has been determined by the embedded logic 1150 as having the most unsafe driving condition and the simulation 1144 has been determined by the embedded logic 1150 as having the safest driving condition. In some embodiments, simulations that have a safety score less than a threshold value can be used to test and/or revise embedded algorithms and/or logic of autonomous vehicles. For example, in some embodiments, a threshold value for selecting simulation scenarios is 5. In this example, any simulation scenario having a safety score of 5 or less can be selected for testing embedded algorithms and/or logic of autonomous vehicles. For instance, in FIG. 11, the simulation 1142 and the simulation 1146 can be selected for testing embedded algorithms and/or logic of autonomous vehicles.

Figure 12:
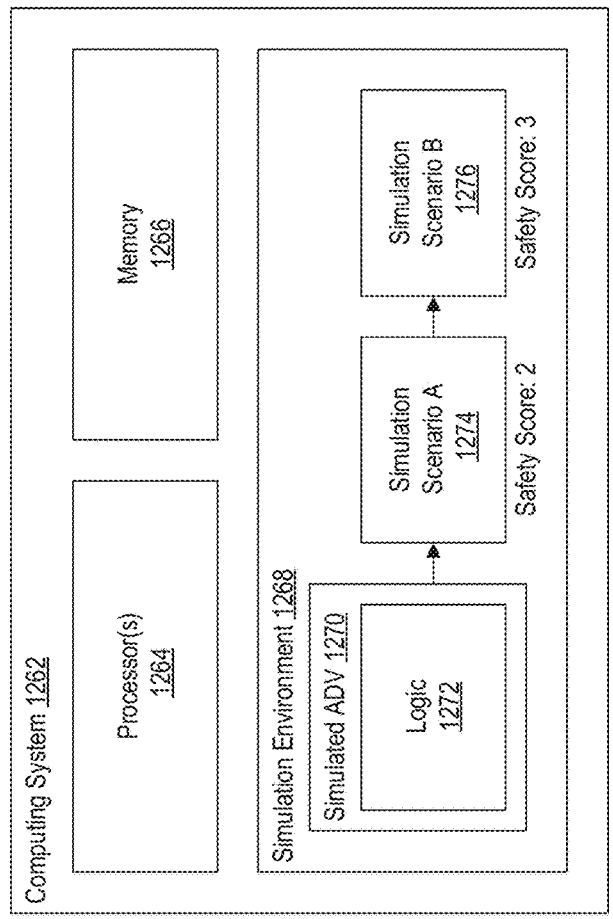

FIG. 12 illustrates an example computing environment 1260 for testing embedded algorithms and/or logic of autonomous vehicles in simulations, according to an embodiment of the present disclosure. As shown in FIG. 12, the computing environment 1260 can include a computing system 1262. The computing system 1262 can comprise one or more processors 1264 and a memory 1266 storing instructions that, when executed by the processors 1264, can create a simulation environment 1268 for testing safety of embedded algorithms and/or logic 1272. In the simulation environment 1268, the embedded algorithms and/or logic 1272 can be loaded (or compiled) into a simulated autonomous vehicle 1270. The simulated autonomous vehicle 1270 can be simulated to drive through simulation scenarios 1274, 1276 to see how the simulated autonomous vehicle 1270 reacts to unsafe driving conditions depicted in the simulation scenarios 1274, 1276. As discussed above, in general, the simulation scenarios 1274, 1276 are scenarios having an unsafe driving condition. By running simulations through the simulation scenarios 1274, 1276, the embedded algorithms and/or logic 1272 can be robustly tested under real-world driving conditions.

Figure 13:
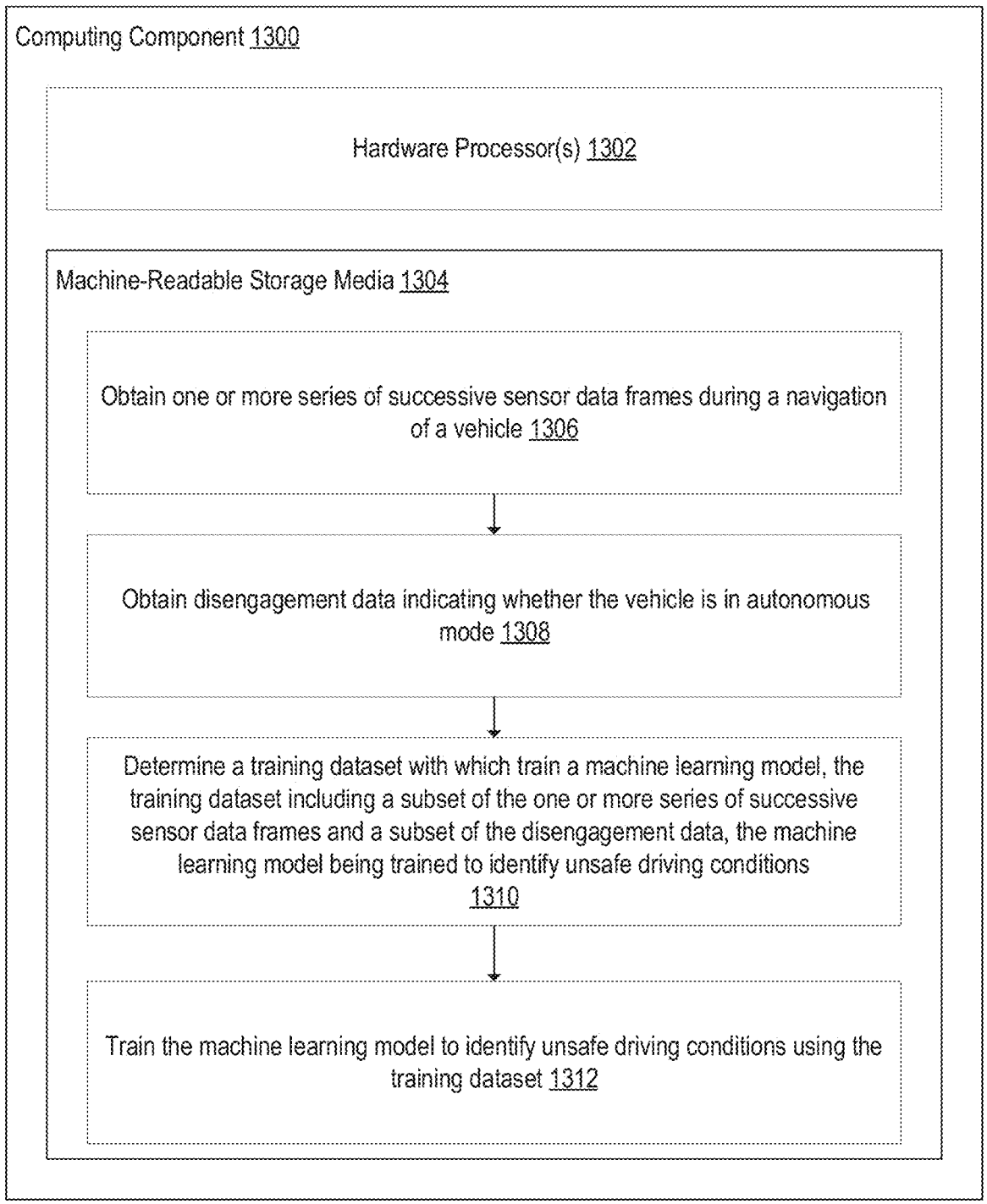
FIG. 13 illustrates a computing component that includes one or more hardware processors and machine-readable storage media storing a set of machine-readable/machine-executable instructions that, when executed, cause the hardware processor(s) to perform an illustrative method for training a machine learning model, according to an embodiment of the present disclosure.

FIG. 13 illustrates a computing component 1300 that includes one or more hardware processors 1302 and machine-readable storage media 1304 storing a set of machine-readable/machine-executable instructions that, when executed, cause the hardware processor(s) 1302 to perform an illustrative method for determining a training dataset to train a machine learning model, according to an embodiment of the present disclosure. The computing component 1300 may be, for example, the computing system 1400 of FIG. 14. The hardware processors 1302 may include, for example, the processor(s) 1404 of FIG. 14 or any other processing unit described herein. The machine-readable storage media 1404 may include the main memory 1406, the read-only memory (ROM) 1408, the storage 1410 of FIG. 14, and/or any other suitable machine-readable storage media described herein.

At block 1306, the hardware processor(s) 1302 may execute machine-readable/machine-executable instructions stored in the machine-readable storage media 1304 to obtaining one or more series of successive sensor data frames during a navigation of a vehicle. In some embodiments, a sensor data frame of the one or more series of successive sensor data frames can comprise image data merged with light detection and ranging data.

At block 1308, the hardware processor(s) 1302 may execute machine-readable/machine-executable instructions stored in the machine-readable storage media 1304 to obtaining disengagement data indicating whether the vehicle is in autonomous mode. In some embodiments, the disengagement data comprises at least one of steering wheel rotation data, acceleration pedal depression data, or brake pedal depression data.

At block 1310, the hardware processor(s) 1302 may execute machine-readable/machine-executable instructions stored in the machine-readable storage media 1304 to determine a training dataset with which train a machine learning model, the training dataset including a subset of the one or more series of successive sensor data frames and a subset of the disengagement data, the machine learning model being trained to identify unsafe driving conditions. At block 1412, the hardware processor(s) 1302 may execute machine-readable/machine-executable instructions stored in the machine-readable storage media 1304 to train the machine learning model to identify unsafe driving conditions using the training dataset. The trained machine learning model may be inputted or integrated into embedded logic and/or algorithms that control decision making of a vehicle, or a simulated vehicle that is used to further test and assess decision making and validate the embedded logic and/or algorithms.

Figure 14:
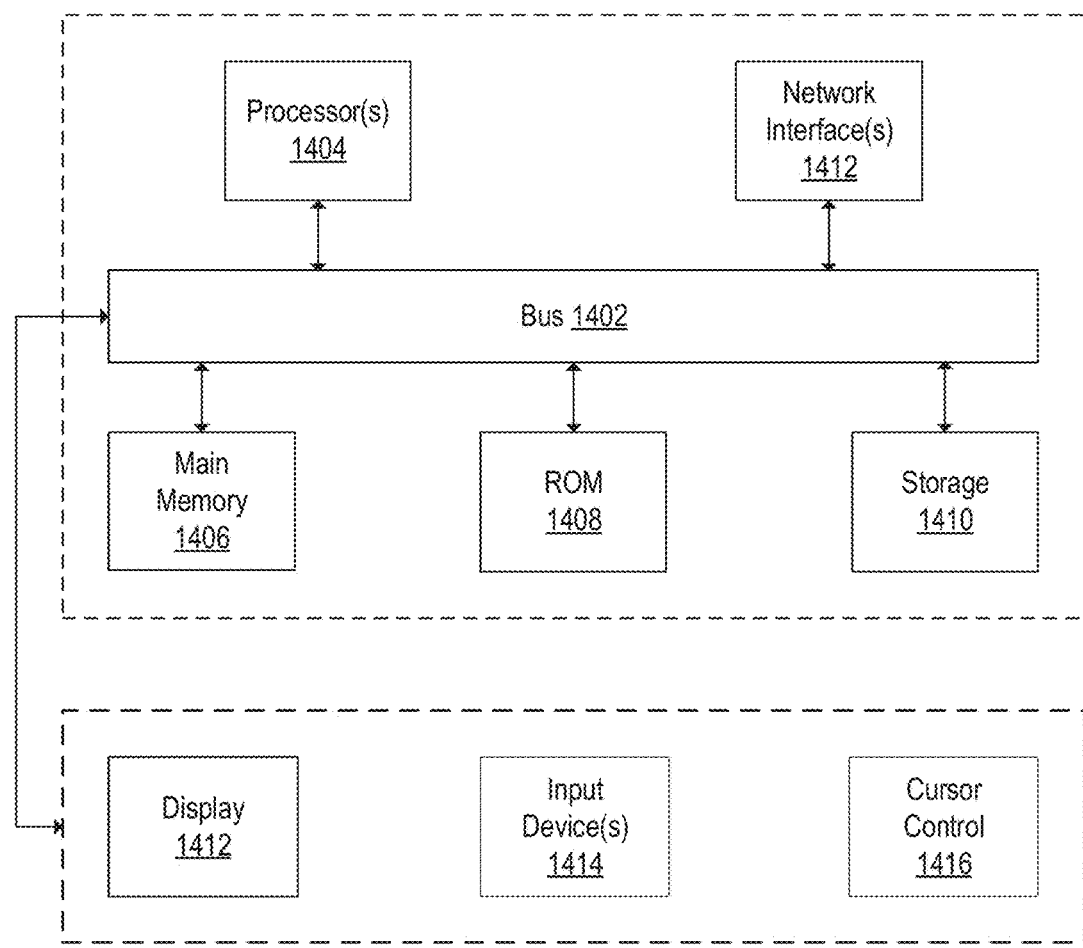
FIG. 14 illustrates a block diagram of a computer system upon which any of the embodiments described herein may be implemented.

FIG. 14 illustrates a block diagram of a computer system 1400 upon which any of the embodiments described herein may be implemented. The computer system 1400 includes a bus 1402 or other communication mechanism for communicating information, one or more hardware processors 1404 coupled with bus 1402 for processing information. A description that a device performs a task is intended to mean that one or more of the hardware processor(s) 1404 performs.

The computer system 1400 also includes a main memory 1406, such as a random access memory (RAM), cache and/or other dynamic storage devices, coupled to bus 1402 for storing information and instructions to be executed by processor 1404. Main memory 1406 also may be used for storing temporary variables or other intermediate information during execution of instructions to be executed by processor 1404. Such instructions, when stored in storage media accessible to processor 1404, render computer system 1400 into a special-purpose machine that is customized to perform the operations specified in the instructions.

The computer system 1400 further includes a read only memory (ROM) 1408 or other static storage device coupled to bus 1402 for storing static information and instructions for processor 1404. A storage device 1410, such as a magnetic disk, optical disk, or USB thumb drive (Flash drive), etc., is provided and coupled to bus 1402 for storing information and instructions.

The computer system 1400 may be coupled via bus 1402 to output device(s) 1412, such as a cathode ray tube (CRT)

or LCD display (or touch screen), for displaying information to a computer user. Input device(s) 1414, including alphanumeric and other keys, are coupled to bus 1402 for communicating information and command selections to processor 1404. Another type of user input device is cursor control 1416. The computer system 1400 also includes a communication interface 1418 coupled to bus 1402.

Unless the context requires otherwise, throughout the present specification and claims, the word "comprise" and variations thereof, such as, "comprises" and "comprising" are to be construed in an open, inclusive sense, that is as "including, but not limited to." Recitation of numeric ranges of values throughout the specification is intended to serve as a shorthand notation of referring individually to each separate value falling within the range inclusive of the values defining the range, and each separate value is incorporated in the specification as it were individually recited herein. Additionally, the singular forms "a," "an" and "the" include plural referents unless the context clearly dictates otherwise. The phrases "at least one of," "at least one selected from the group of," or "at least one selected from the group consisting of," and the like are to be interpreted in the disjunctive (e.g., not to be interpreted as at least one of A and at least one of B).

Reference throughout this specification to "one embodiment" or "an embodiment" means that a particular feature, structure or characteristic described in connection with the embodiment is included in at least one embodiment of the present invention. Thus, the appearances of the phrases "in one embodiment" or "in an embodiment" in various places throughout this specification are not necessarily all referring to the same embodiment, but may be in some instances. Furthermore, the particular features, structures, or characteristics may be combined in any suitable manner in one or more embodiment.

A component being implemented as another component may be construed as the component being operated in a same or similar manner as another component, and/or comprising same or similar features, characteristics, and parameters as another component.

We claim:

1. A system comprising:
   one or more processors; and
   a memory storing instructions that, when executed by the one or more processors, cause the system to perform:
      obtaining one or more series of successive sensor data frames during a navigation of a vehicle;
      obtaining disengagement data indicating whether the vehicle is in autonomous mode;
      determining or generating a training dataset to train a machine learning model, the training dataset including a subset of the one or more series of successive sensor data frames and a subset of the disengagement data, the machine learning model being trained to identify unsafe driving conditions, wherein the training dataset comprises a first training dataset that comprises series of frames in which conditions are labelled or identified as safe and associated with the autonomous mode, and a second training dataset that comprises series of frames in which conditions are labelled or identified as unsafe and associated with a manual mode;
      training the machine learning model using the first training dataset;
      training the machine learning model using the second training dataset to identify unsafe driving conditions using the training dataset;
      obtaining or generating scenarios from the series of successive sensor data frames;
      selecting, using the trained machine learning model, a subset of the scenarios as simulations; and
      in response to training the machine learning model, selectively incorporating the machine learning model into embedded logic that is loaded or compiled into the vehicle that navigates through the subset of the scenarios, wherein the scenarios are used to confirm safety of the vehicle.

2. The system of claim 1, wherein the training of the machine learning model includes training the machine learning model to determine a level of safety of a simulation scenario comprising the series of successive sensor data frames depicting a driving condition.

3. The system of claim 1, wherein the first training dataset and the second training dataset correspond to a common location.

4. The system of claim 1, wherein a first portion of the one or more series of successive sensor data frames indicates that a driver has disengaged the vehicle from the autonomous mode and the second portion of the one or more series of successive sensor data frames indicates that the vehicle remains in the autonomous mode.

5. The system of claim 1, wherein the one or more series of successive sensor data frames are timestamp-synchronized with the disengagement data.

6. The system of claim 1, wherein the sensor data frame of the one or more series of successive sensor data frames comprises image data merged with light detection and ranging data.

7. The system of claim 1, wherein the disengagement data comprises at least one of steering wheel rotation data, acceleration pedal depression data, or brake pedal depression data.

8. The system of claim 1, wherein the instructions, when executed, cause the system to further perform:
   obtaining a plurality of simulation scenarios;
   determining, based on the at least one machine learning model, safety scores corresponding to the plurality of simulation scenarios;
   selecting, based on the safety scores, a set of simulation scenarios with which to test the embedded logic of an autonomous vehicle from the plurality of simulation scenarios; and
   testing the embedded logic with the set of simulation scenarios in a simulation.

9. The system of claim 8, wherein the set of simulation scenarios is selected based on the safety scores being less than a threshold value.

10. A computer-implemented method comprising:
    obtaining one or more series of successive sensor data frames during a navigation of a vehicle;
    obtaining disengagement data indicating whether the vehicle is in autonomous mode;
    determining or generating a training dataset to train a machine learning model, the training dataset including a subset of the one or more series of successive sensor data frames and a subset of the disengagement data, the machine learning model being trained to identify unsafe driving conditions, wherein the training dataset comprises a first training dataset that comprises series of frames in which conditions are labelled or identified as safe and associated with the autonomous mode, a second training dataset that comprises series of frames in which conditions are labelled or identified as unsafe and associated with a manual mode;

training the machine learning model using the first training dataset;

training the machine learning model using the second training dataset to identify unsafe driving conditions using the training dataset;

obtaining or generating scenarios from the series of successive sensor data frames;

selecting, using the trained machine learning model, a subset of the scenarios as simulations;

and in response to training the machine learning model, selectively incorporating the machine learning model into embedded logic that is loaded or compiled into the vehicle that navigates through the subset of the scenarios, wherein the scenarios are used to confirm safety of the vehicle.

11. The computer-implemented method of claim 10, wherein the training of the machine learning model includes training the machine learning model to determine a level of safety of a simulation scenario comprising the series of successive sensor data frames depicting a driving condition.

12. The computer-implemented method of claim 10, wherein the first training dataset and the second training dataset correspond to a common location.

13. The computer-implemented method of claim 10, wherein a first portion of the one or more series of successive sensor data frames indicates that a driver has disengaged the vehicle from the autonomous mode and the second portion of the one or more series of successive sensor data frames indicates that the vehicle remains in the autonomous mode.

14. A non-transitory computer storage media of a computing system storing instructions that, when executed by one or more processors of the computing system, cause the computing system to perform a method comprising:

obtaining one or more series of successive sensor data frames during a navigation of a vehicle;

obtaining disengagement data indicating whether the vehicle is in autonomous mode;

determining or generating a training dataset to train a machine learning model, the training dataset including a subset of the one or more series of successive sensor data frames and a subset of the disengagement data, the machine learning model being trained to identify unsafe driving conditions, wherein the training dataset comprises a first training dataset that comprises series of frames in which conditions are labelled or identified as safe and associated with the autonomous mode, and a second training dataset that comprises series of frames in which conditions are labelled or identified as unsafe and associated with a manual mode;

training the machine learning model using the first training dataset;

training the machine learning model using the second training dataset to identify unsafe driving conditions using the training dataset;

obtaining or generating scenarios from the series of successive sensor data frames;

selecting, using the trained machine learning model, a subset of the scenarios as simulations;

and in response to training the machine learning model, selectively incorporating the machine learning model into embedded logic that is loaded or compiled into the vehicle that navigates through the subset of the scenarios, wherein the scenarios are used to confirm safety of the vehicle.

15. The non-transitory computer storage media of claim 14, wherein the training of the machine learning model includes training the machine learning model to determine a level of safety of a simulation scenario comprising the series of successive sensor data frames depicting a driving condition.

16. The non-transitory computer storage media of claim 14, wherein the first training dataset and the second training dataset correspond to a common location.

17. The non-transitory computer storage media of claim 14, wherein the instructions, when executed, cause the computing system to further perform:

obtaining a plurality of simulation scenarios;

determining, based on the machine learning model, safety scores corresponding to the plurality of simulation scenarios;

selecting, based on the safety scores, a set of simulation scenarios with which to test the embedded logic of an autonomous vehicle from the plurality of simulation scenarios; and testing the embedded logic with the set of simulation scenarios in a simulation.

18. The non-transitory computer storage media of claim 17, wherein the set of simulation scenarios is selected based on the safety scores being less than a threshold value.

19. The system of claim 1, wherein the instructions, when executed, cause the system to further perform:

adjusting weights or biases of sigmoid functions within the machine learning model based on an accuracy, precision, or recall.

20. The system of claim 1, wherein the first training dataset and the second training dataset are distinguished on a basis of a criterion of a criteria, the criteria comprising a distance between vehicles, a road type, a degree of lighting, a density of traffic, and a concentration of pedestrians.

* * * * *